US012807846B2

(12) United States Patent
Takahashi et al.

(10) Patent No.: US 12,807,846 B2
(45) Date of Patent: Nov. 24, 2026

(54) LAMINATED CONDUCTIVE FABRIC TAPE

(71) Applicant: Yazaki Corporation, Tokyo (JP)

(72) Inventors: Naoya Takahashi, Susono (JP); Moeko Aoki, Susono (JP)

(73) Assignee: Yazaki Corporation, Tokyo (JP)

( * ) Notice: Subject to any disclaimer, the term of this patent is extended or adjusted under 35 U.S.C. 154(b) by 120 days.

(21) Appl. No.: 18/828,449

(22) Filed: Sep. 9, 2024

(65) Prior Publication Data

US 2025/0092286 A1 Mar. 20, 2025

(30) Foreign Application Priority Data

Sep. 15, 2023 (JP) ................................ 2023-150133

(51) Int. Cl.

| | |
|---|---|
| ***C09J 7/29*** | (2018.01) |
| ***B32B 15/14*** | (2006.01) |
| ***C09J 7/21*** | (2018.01) |
| ***C09J 7/28*** | (2018.01) |

(52) U.S. Cl.

CPC ................ *C09J 7/29* (2018.01); *B32B 15/14* (2013.01); *C09J 7/21* (2018.01); *C09J 7/28* (2018.01); *B32B 2250/04* (2013.01); *B32B 2307/202* (2013.01); *B32B 2405/00* (2013.01); *C09J 2203/302* (2013.01); *C09J 2301/122* (2020.08); *C09J 2301/312* (2020.08); *C09J 2301/314* (2020.08); *C09J 2400/163* (2013.01); *C09J 2400/263* (2013.01)

(58) Field of Classification Search

None

See application file for complete search history.

(56) References Cited

U.S. PATENT DOCUMENTS

| | | | | |
|---|---|---|---|---|
| 2005/0032975 | A1 | 2/2005 | Sakaguchi et al. | |
| 2005/0288402 | A1* | 12/2005 | Kosaka | C08L 53/02 524/90 |
| 2014/0272351 | A1* | 9/2014 | Creasy, Jr. | C09J 7/21 428/354 |
| 2017/0275793 | A1* | 9/2017 | Shirotani | D01D 5/0985 |
| 2019/0143636 | A1* | 5/2019 | Seo | B32B 15/14 361/760 |

FOREIGN PATENT DOCUMENTS

| | | | | |
|---|---|---|---|---|
| JP | S61-086443 | U | 6/1986 | |
| JP | H11-116911 | A | 4/1999 | |
| JP | 2005-033907 | A | 2/2005 | |
| JP | 2019-119458 | A | 7/2019 | |
| JP | 2021-109928 | A | 8/2021 | |
| JP | 2021-140950 | A | 9/2021 | |
| JP | 2022-130302 | A | 9/2022 | |
| JP | 2025042926 | A * | 3/2025 | C09J 7/29 |
| WO | WO-2022081070 | A1 * | 4/2022 | B32B 15/08 |

OTHER PUBLICATIONS

Machine translation of JP 2025042926 a (Year: 2025).*

* cited by examiner

*Primary Examiner* — Frank D Ducheneaux
(74) *Attorney, Agent, or Firm* — Banner & Witcoff, Ltd.

(57) ABSTRACT

A laminated conductive fabric tape having a three-layer structure includes: a conductive fabric made of a metal-plated fabric material; an adhesive layer formed on one surface side of the conductive fabric; and a thermoplastic resin layer formed on the other surface side of the conductive fabric. The conductive fabric has a surface roughness Ra of 11.9 or more. The thermoplastic resin layer has a Shore A hardness of 50 or more and 98 or less and a thickness of 100 μm or more and 800 μm or less.

2 Claims, 7 Drawing Sheets

FIG. 7

| | | EXAMPLE 1 | EXAMPLE 2 | EXAMPLE 3 | EXAMPLE 4 | EXAMPLE 5 | EXAMPLE 6 |
|---|---|---|---|---|---|---|---|
| CONDUCTIVE FABRIC | PLATING TYPE | Cu PLATING | Cu PLATING | Cu PLATING | Cu PLATING | Cu PLATING | Cu PLATING |
| | FABRIC MATERIAL | NONWOVEN FABRIC | NONWOVEN FABRIC | WOVEN FABRIC | NONWOVEN FABRIC | NONWOVEN FABRIC | NONWOVEN FABRIC |
| | SURFACE ROUGHNESS Ra | 11.9 | 23.3 | 20.8 | 11.9 | 11.9 | 11.9 |
| THERMOPLASTIC RESIN LAYER | RESIN TYPE | PVC | PVC | PVC | PVC | PVC | PVC |
| | HARDNESS (SHORE A) | 98 | 98 | 98 | 98 | 98 | 98 |
| | THICKNESS (μm) | 100 | 200 | 200 | 800 | 200 | 200 |
| SEALING AGENT LAYER | THICKNESS (μm) | - | - | - | - | 50 | 50 |
| | 100% MODULUS (MPa) | - | - | - | - | 0.1 | 16.4 |
| ADHESIVE LAYER | TYPE | W-314 (DIC MANU-FACTURED) | W-314 (DIC MANU-FACTURED) | W-314 (DIC MANU-FACTURED) | W-314 (DIC MANU-FACTURED) | W-314 (DIC MANU-FACTURED) | W-314 (DIC MANU-FACTURED) |
| | THICKNESS (μm) | 40 | 40 | 40 | 40 | 40 | 40 |
| ADHESIVENESS (T-PEEL TEST) | A: 2.0 N OR MORE<br>B: MORE THAN 1.0 N AND LESS THAN 2.0 N<br>C: LESS THAN 1.0 N | B | A | A | B | B | B |
| TAPE EDGE PEELING | A: 1.0 mm OR LESS<br>B: MORE THAN 1.0 mm AND LESS THAN 2.0 mm<br>C: 2.0 mm OR MORE | A | A | A | B | A | B |
| TAPE ABRASION TEST | A: 300 mm OR MORE<br>B: MORE THAN 100 mm AND LESS THAN 300 mm<br>C: LESS THAN 100 mm | B | A | A | A | A | A |

FIG. 8

| | | EXAMPLE 7 | EXAMPLE 8 | EXAMPLE 9 | EXAMPLE 10 | EXAMPLE 11 | COMPARATIVE EXAMPLE 1 |
|---|---|---|---|---|---|---|---|
| CONDUCTIVE FABRIC | PLATING TYPE | Cu PLATING | Cu PLATING | Cu PLATING | Cu PLATING | Cu PLATING | Cu PLATING |
| | FABRIC MATERIAL | NONWOVEN FABRIC | NONWOVEN FABRIC | NONWOVEN FABRIC | NONWOVEN FABRIC | NONWOVEN FABRIC | NONWOVEN FABRIC |
| | SURFACE ROUGHNESS Ra | 23.3 | 23.3 | 23.3 | 23.3 | 23.3 | 11.9 |
| THERMOPLASTIC RESIN LAYER | RESIN TYPE | PP | PE | PVC | PVC | PVC | NOT PROVIDED |
| | HARDNESS (SHORE A) | 95 | 93 | 98 | 98 | 98 | - |
| | THICKNESS (μm) | 200 | 200 | 200 | 200 | 200 | - |
| SEALING AGENT LAYER | THICKNESS (μm) | - | - | 25 | 25 | 25 | - |
| | 100% MODULUS (MPa) | - | - | 0.1 | 0.1 | 0.1 | - |
| ADHESIVE LAYER | TYPE | W-314 (DIC MANU-FACTURED) | W-314 (DIC MANU-FACTURED) | W-314 (DIC MANU-FACTURED) | W-314 (DIC MANU-FACTURED) | ORIBAIN BPW 6570 (TOYOCHEM MANUFACTURED) | W-314 (DIC MANU-FACTURED) |
| | THICKNESS (μm) | 40 | 40 | 40 | 65 | 65 | 65 |
| ADHESIVENESS (T-PEEL TEST) | A: 2.0 N OR MORE<br>B: MORE THAN 1.0 N AND LESS THAN 2.0 N<br>C: LESS THAN 1.0 N | A | A | B | B | B | - |
| TAPE EDGE PEELING | A: 1.0 mm OR LESS<br>B: MORE THAN 1.0 mm AND LESS THAN 2.0 mm<br>C: 2.0 mm OR MORE | A | A | A | A | A | C |
| TAPE ABRASION TEST | A: 300 mm OR MORE<br>B: MORE THAN 100 mm AND LESS THAN 300 mm<br>C: LESS THAN 100 mm | A | A | A | A | A | C |

FIG. 9

| | | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 | COMPARATIVE EXAMPLE 7 |
|---|---|---|---|---|---|---|---|
| CONDUCTIVE FABRIC | PLATING TYPE | Cu PLATING | Cu PLATING | Cu PLATING | Cu PLATING | Cu PLATING | Cu PLATING |
| | FABRIC MATERIAL | NONWOVEN FABRIC | NONWOVEN FABRIC | WOVEN FABRIC | NONWOVEN FABRIC | NONWOVEN FABRIC | NONWOVEN FABRIC |
| | SURFACE ROUGHNESS Ra | 11.9 | 11.9 | 8.8 | 11.9 | 11.9 | 11.9 |
| THERMOPLASTIC RESIN LAYER | RESIN TYPE | PVC | PVC | PVC | PVC | PVC | PVC |
| | HARDNESS (SHORE A) | 98 | 25 | 25 | 25 | 25 | 100 |
| | THICKNESS (μm) | 50 | 100 | 100 | 850 | 100 | 100 |
| SEALING AGENT LAYER | THICKNESS (μm) | - | - | - | - | 50 | - |
| | 100% MODULUS (MPa) | - | - | - | - | 16.5 | - |
| ADHESIVE LAYER | TYPE | W-314 (DIC MANU-FACTURED) | W-314 (DIC MANU-FACTURED) | W-314 (DIC MANU-FACTURED) | W-314 (DIC MANU-FACTURED) | W-314 (DIC MANU-FACTURED) | W-314 (DIC MANU-FACTURED) |
| | THICKNESS (μm) | 40 | 40 | 40 | 40 | 40 | 40 |
| ADHESIVENESS (T-PEEL TEST) | A: 2.0 N OR MORE<br>B: MORE THAN 1.0 N AND LESS THAN 2.0 N<br>C: LESS THAN 1.0 N | B | B | C | B | B | B |
| TAPE EDGE PEELING | A: 1.0 mm OR LESS<br>B: MORE THAN 1.0 mm AND LESS THAN 2.0 mm<br>C: 2.0 mm OR MORE | A | B | A | C | C | C |
| TAPE ABRASION TEST | A: 300 mm OR MORE<br>B: MORE THAN 100 mm AND LESS THAN 300 mm<br>C: LESS THAN 100 mm | C | C | B | A | B | B |

LAMINATED CONDUCTIVE FABRIC TAPE

CROSS-REFERENCE TO RELATED APPLICATION(S)

This application is based upon and claims the benefit of priority from prior Japanese patent application No. 2023-150133 filed on Sep. 15, 2023, the entire contents of which are incorporated herein by reference.

BACKGROUND

1. Field of the Invention

The present disclosure relates to a laminated conductive fabric tape.

2. Description of the Related Art

In the related art, a laminated conductive fabric tape is known in which an adhesive layer is provided on a conductive nonwoven fabric that is made conductive by plating a nonwoven fabric with a metal (for example, refer to JP2021-140950A). Here, since such a laminated conductive fabric tape is stored while being circumferentially wound, the conductive nonwoven fabric and the adhesive positioned on the outer side of the conductive nonwoven fabric are in contact with each other. For this reason, when an operator pulls out (unwinds) the laminated conductive fabric tape in a straight line from this state, a part of the metal plating on the conductive nonwoven fabric may peel off and adhere to the adhesive layer, and the adhesive strength of the adhesive layer may decrease. Accordingly, there is a problem in that when the laminated conductive fabric tape is attached to an electric wire, edge peeling occurs, that is, the tape peels off from an edge thereof. Therefore, a laminated conductive fabric tape in which a release paper is provided on the adhesive layer is proposed (for example, refer to JP2022-130302A).

However, as described in JP2022-130302A, for a laminated conductive fabric tape including release paper, it is necessary to peel off the release paper at the time of manufacturing a wire harness or the like. For example, the work of winding the half-wrap while peeling the release paper off is difficult, which tends to increase the manufacturing cost.

Further, when the laminated conductive fabric tape is used in a vibration environment such as a vehicle or the like, friction between the conductive fabric and surrounding devices may cause the plating to peel off, resulting in a decrease in shielding performance. Therefore, it is conceivable to further provide an exterior member to cover the laminated conductive fabric tape, but in this case, the use of the exterior member results in an increase in size and cost.

SUMMARY

The present disclosure has been made in order to solve such a problem in the related art, and an object of the present disclosure is to provide a laminated conductive fabric tape capable of suppressing an increase in manufacturing cost, suppressing the edge peeling, and suppressing peeling of plating in a usage environment.

According to an aspect of the present disclosure, there is provided a laminated conductive fabric tape having a three-layer structure including: a conductive fabric made of a metal-plated fabric material; an adhesive layer formed on one surface side of the conductive fabric; and a thermoplastic resin layer formed on the other surface side of the conductive fabric, in which the conductive fabric has a surface roughness Ra of 11.9 or more, and in which the thermoplastic resin layer has a Shore A hardness of 50 or more and 98 or less and a thickness of 100 μm or more and 800 μm or less.

According to another aspect of the present disclosure, there is provided a laminated conductive fabric tape having a four-layer structure including: a conductive fabric made of a metal-plated fabric material; an adhesive layer formed on one surface side of the conductive fabric; a thermoplastic resin layer formed on the other surface side of the conductive fabric; and a sealing agent layer interposed between the conductive fabric and the adhesive layer to prevent the adhesive layer from permeating into the conductive fabric, in which the conductive fabric has a surface roughness Ra of 11.9 or more, in which the thermoplastic resin layer has a Shore A hardness of 50 or more and 98 or less and a thickness of 100 μm or more and 800 μm or less, and in which the sealing agent layer has a 100% tensile modulus of 16.4 MPa or less.

According to the present disclosure, it is possible to provide a laminated conductive fabric tape capable of suppressing an increase in manufacturing cost, suppressing the edge peeling, and suppressing peeling of plating in a usage environment.

BRIEF DESCRIPTION OF THE DRAWINGS

The present disclosure will become more fully understood from the detailed description given hereinbelow and the accompanying drawing which is given by way of illustration only, and thus is not limitative of the present disclosure and wherein:

FIGS. 2A and 2B are configuration diagrams showing the laminated conductive fabric tape shown in FIG. 1, in which FIG. 2A shows a cross section orthogonal to a tape longitudinal direction, and FIG. 2B shows a partial enlarged view of FIG. 2A;

FIG. 7 is a first table showing examples and comparative examples;

FIG. 8 is a second table showing examples and comparative examples; and

FIG. 9 is a third table showing examples and comparative examples.

DETAILED DESCRIPTION OF THE INVENTION

Hereinafter, the present disclosure will be described with reference to a preferred embodiment. The disclosure is not limited to the embodiments to be described below, and the embodiments can be appropriately changed without departing from the scope of the disclosure. In the embodiments described below, there may be portions in which illustration and description of a part of a configuration are omitted, and it is needless to say that a known or well-known technique is appropriately applied to the details of the omitted technique within a range in which no contradiction with the contents described below occurs.

Figure 1:
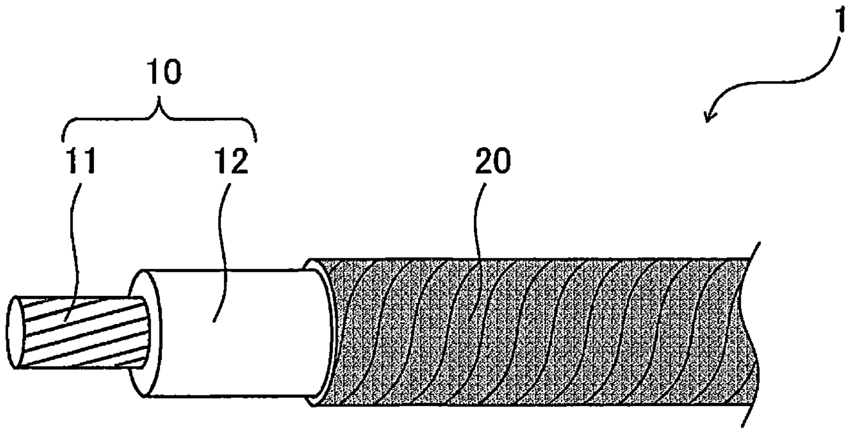
FIG. 1 is a perspective view showing a shielded electric wire having a laminated conductive fabric tape according to an embodiment of the present disclosure.

FIG. 1 is a perspective view showing a shielded electric wire having a laminated conductive fabric tape according to an embodiment of the present disclosure. As shown in FIG. 1, a shielded electric wire 1 includes an electric wire 10 and a laminated conductive fabric tape 20 attached to the periphery of the electric wire 10.

The electric wire 10 includes a conductor 11 made of, for example, copper, aluminum, or an alloy thereof, and an insulating covering portion 12 covering the conductor 11. In the example shown in FIG. 1, the conductor 11 of the electric wire 10 is a twisted wire obtained by twisting a plurality of wires, but is not limited to this and may be a solid wire. Further, the covering portion 12 is assumed to be made of polyvinyl chloride (PVC), polypropylene (PP), or polyethylene (PE), but the material is not limited to these, and may be silicone, polyurethane, nylon, and the like.

Figure 2A:
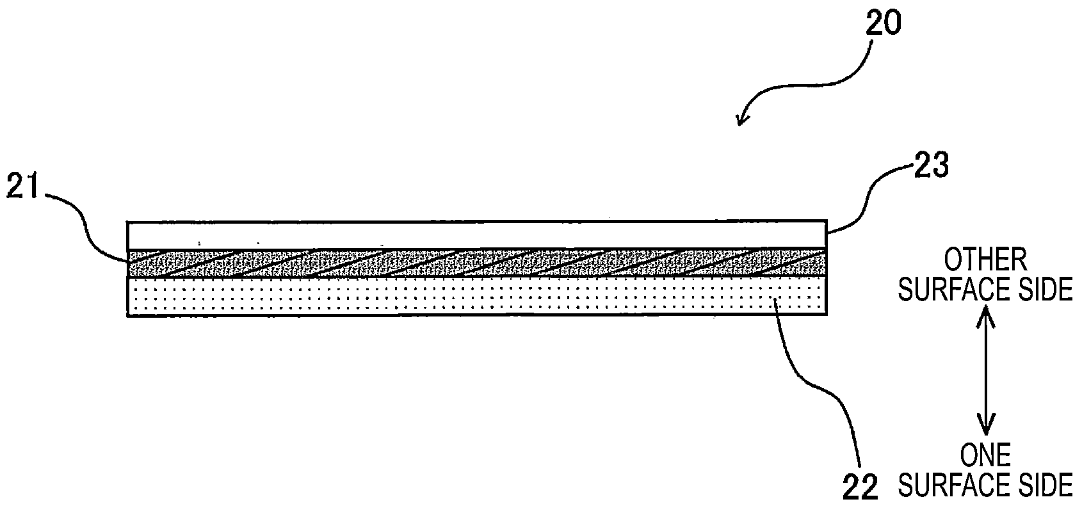
Figure 2B:
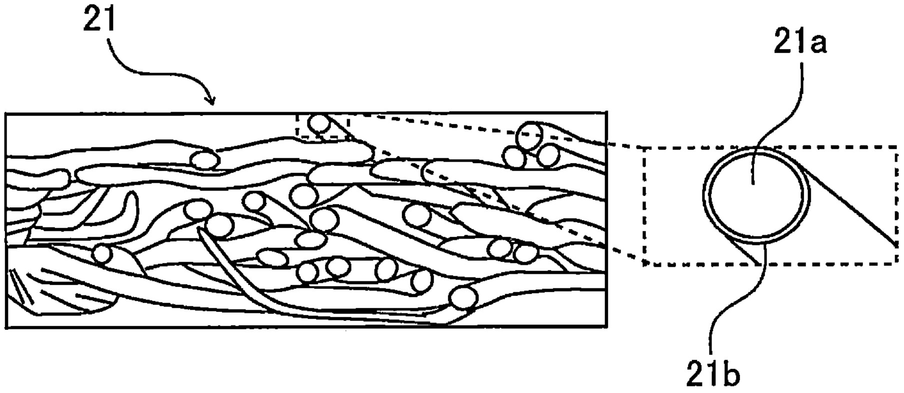

FIGS. 2A and 2B are configuration diagrams showing the laminated conductive fabric tape 20 shown in FIG. 1, in which FIG. 2A shows a cross section orthogonal to a tape longitudinal direction, and FIG. 2B shows a partial enlarged view of FIG. 2A. As shown in FIG. 2A, the laminated conductive fabric tape 20 includes a conductive fabric 21, an adhesive layer 22, and a thermoplastic resin layer 23, and is a three-layer structure.

The conductive fabric 21 is made of a fabric material that is plated with metal. In the present embodiment, as shown in FIG. 2B, the conductive fabric 21 includes, for example, fibers 21*a* constituting the nonwoven fabric and a plated portion 21*b*. The nonwoven fabric is a sheet-shaped member in which the fibers 21*a* are intertwined without being woven. As shown in FIG. B2, the fibers 21*a* of the nonwoven fabric are formed as multiple layers in a thickness direction in terms of manufacturing process. The fibers 21*a* constituting the nonwoven fabric are made of, for example, polyethylene terephthalate (PET), PP, nylon, acrylic, glass fiber, carbon fiber, aramid fiber, polyarylate fiber, or the like.

The plated portion 21*b* is a conductive metal covering the fibers 21*a* constituting the nonwoven fabric. The plated portion 21*b* is made of, for example, copper, nickel, tin, silver, or an alloy of these metals. The plated portion 21*b* may be formed in a single layer on the fibers 21*a* constituting the nonwoven fabric or may be formed in a plurality of layers. Therefore, the plated portion 21*b* may be formed, for example, as copper (first layer) and tin (second layer) on the fibers 21*a* constituting the nonwoven fabric.

It should be noted that the conductive fabric 21 is not limited to the fabric in which the plated portion 21*b* is applied to the fibers 21*a* constituting the nonwoven fabric, but may be a fabric in which the plated portion 21*b* is applied to the fibers 21*a* constituting a woven fabric or knitted fabric. In addition, the plated portion 21*b* is not limited to being applied to each individual fiber 21*a*, but may be applied to a fabric material. That is, the former conductive fabric 21 is formed by applying the plated portion 21*b* to the fibers 21*a* and then processing the fibers 21*a* with the plated portion 21*b* to form a woven fabric or nonwoven fabric. Further, the latter conductive fabric 21 is formed by forming a woven fabric or nonwoven fabric from the fibers 21*a* and then applying the plated portion 21*b*.

The adhesive layer 22 is formed on one surface side of the conductive fabric 21, and exhibits adhesiveness for attaching the laminated conductive fabric tape 20 to the covering portion 12 of the electric wire 10. The adhesive layer 22 is made of, for example, any one of an acrylic resin, a silicone resin, a rubber-based adhesive (including natural rubber (NR) or styrene isoprene styrene rubber (SIS)), and a urethane adhesive, or a combination thereof. Such an adhesive layer 22 is an adhesive having a storage modulus G' less than $10^7$ when the dynamic viscosity measurement is performed in an atmosphere at 25 °C and a frequency of 1 Hz. The thermoplastic resin layer 23 is formed on the other surface side of the conductive fabric 21. In the present embodiment, the thermoplastic resin layer 23 is made of polyvinyl chloride (PVC), olefin resin (PP, PE), polyester, nylon, silicone, or the like.

Here, the conductive fabric 21 has a surface roughness Ra of 11.9 or more. Therefore, the surface of the conductive fabric 21 is roughened to a certain degree, and the surface area is made larger than a case where the surface is not roughened. Accordingly, a contact area between the conductive fabric 21 and the thermoplastic resin layer 23 is ensured, and the conductive fabric 21 and the thermoplastic resin layer 23 are brought into close contact with each other more firmly. Therefore, when the circumferentially wound laminated conductive fabric tape 20 is unwound, the thermoplastic resin layer 23 is prevented from peeling off and adhering to the adhesive layer 22. That is, it is possible to reduce the possibility that the thermoplastic resin layer 23 adheres to the adhesive layer 22, causing a decrease in the adhesive strength of the adhesive layer 22, thereby preventing the edge peeling.

Further, the thermoplastic resin layer 23 has a Shore A hardness of 98 or less as measured by a JIS K 6253 durometer type A, and a thickness of 800 μm or less. With this configuration, the thermoplastic resin layer 23 is limited in hardness and thickness. As a result, the thermoplastic resin layer 23 is formed to be soft and thin to a certain degree, so that a force with which the laminated conductive fabric tape 20 attached to the electric wire 10 attempts to return to an original shape is weakened, thereby reducing the possibility of edge peeling.

The thermoplastic resin layer 23 has a Shore A hardness of 50 or more and a thickness of 100 μm or more. Therefore, the thermoplastic resin layer 23 has a hardness and a thickness equal to or greater than a certain degree, and can exhibit a protection function of a certain level or more. Accordingly, peeling of the plating in the usage environment can also be suppressed.

Figure 3:
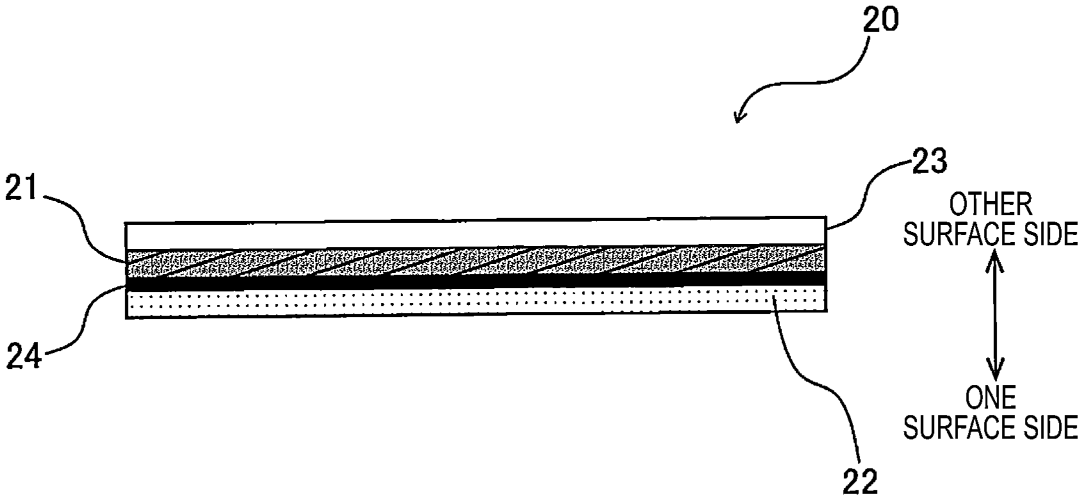
FIG. 3 is a configuration diagram showing another example of the laminated conductive fabric tape shown in FIG. 1, showing a section orthogonal to the tape longitudinal direction.

Here, the laminated conductive fabric tape 20 is not limited to a three-layer structure, and may be a four-layer structure. FIG. 3 is a configuration diagram showing another example of the laminated conductive fabric tape 20 shown in FIG. 1, showing a section orthogonal to the tape longitudinal direction.

As shown in FIG. 3, the laminated conductive fabric tape 20 according to another example includes a sealing agent layer 24 in addition to the conductive fabric 21, the adhesive layer 22, and the thermoplastic resin layer 23 described above.

The sealing agent layer 24 is interposed between the conductive fabric 21 and the adhesive layer 22, and serves to prevent the adhesive layer 22 from penetrating into the conductive fabric 21. The sealing agent layer 24 is made of any one or a combination of acrylic resin, silicone resin, urethane resin, phenol resin, styrene resin, olefin resin, nylon resin, ethylene-vinyl acetate copolymer, polyester resin, and the like. In addition, a crosslinking agent may be used in the sealing agent layer 24.

Furthermore, the sealing agent layer 24 has a 100% tensile modulus after drying of 16.4 MPa or less. The 100% tensile modulus indicates a tensile load required to reach a 100% elongated state. That is, after drying, the load required for the length of the sealing agent layer 24 to double is 16.4 MPa or less. In this way, even when the sealing agent layer 24 is used, the sealing agent layer 24 has a limited hardness. As a result, the force with which the laminated conductive fabric tape 20 attached to the electric wire 10 attempts to return to an original shape is weakened, thereby reducing the possibility of edge peeling.

Figure 4:
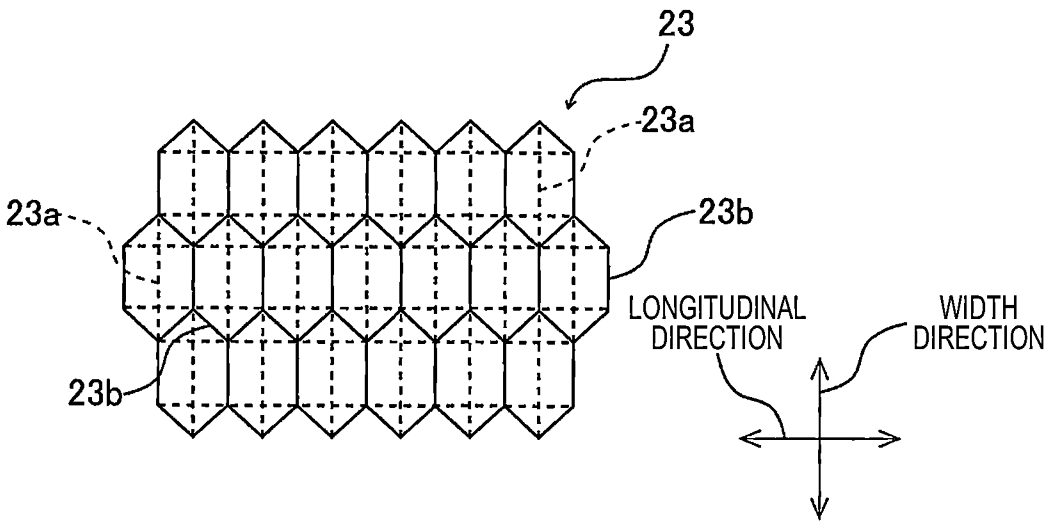
FIG. 4 is a first plan view showing a surface shape of a thermoplastic resin layer.
Figure 5:
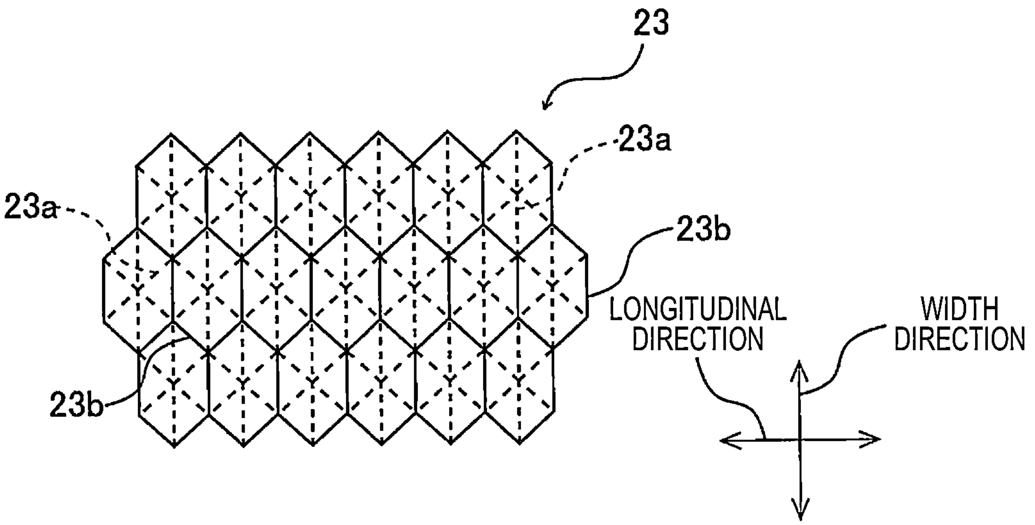
FIG. 5 is a second plan view showing the surface shape of the thermoplastic resin layer.
Figure 6:
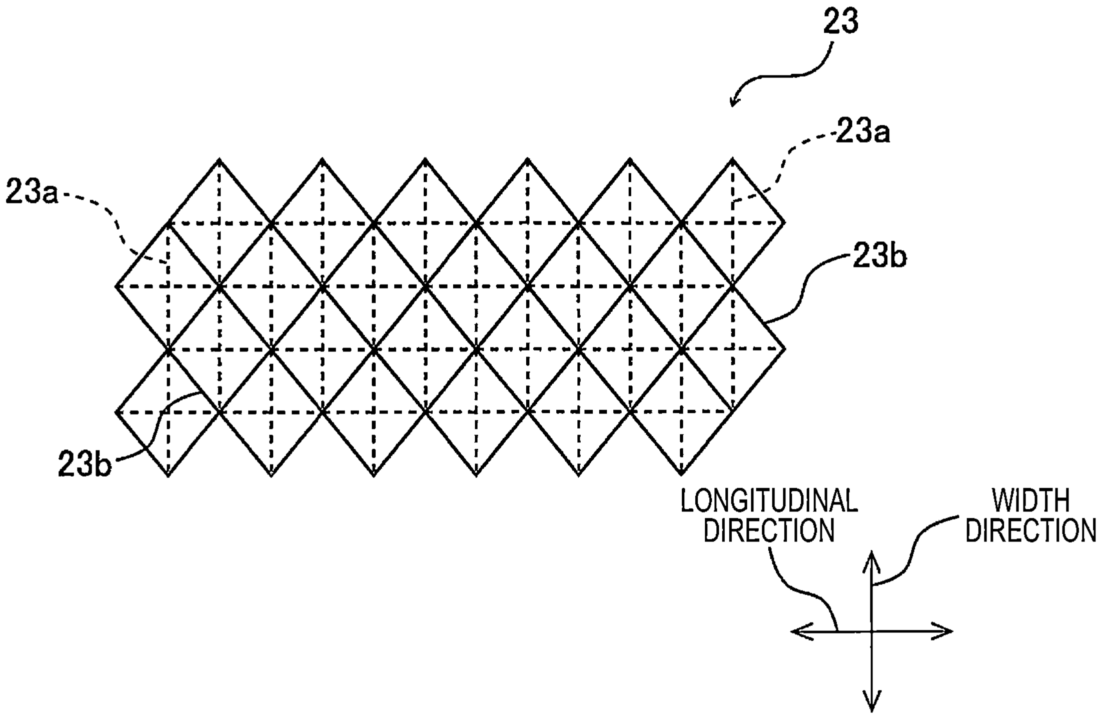
FIG. 6 is a third plan view showing the surface shape of the thermoplastic resin layer.

FIGS. 4 to 6 are plan views showing the surface shape of the thermoplastic resin layer 23. As shown in FIGS. 4 to 6, the thermoplastic resin layer 23 preferably has an uneven structure in which valley portions 23*a* recessed toward the one surface side and mountain portions 23*b* protruding toward the other surface side are continuous.

Specifically, in the example shown in FIG. 4, the thermoplastic resin layer 23 has hexagonal mountain portions 23*b* that are long in a width direction, and these mountain portions are fitted together without any gaps in the longitudinal direction and width direction to form a continuous structure. Further, the valley portion 23*a* is formed to connect the vertices of the hexagonal shape along the longitudinal direction and the width direction.

In the example shown in FIG. 5, the mountain portions 23*b* are also in a hexagonal shape that is long in the width direction, and these mountain portions are fitted together without any gaps in the longitudinal direction and width direction to form a continuous structure. Further, the valley portion 23*a* is formed to connect opposing vertices of the hexagon.

In the example shown in FIG. 6, the thermoplastic resin layer 23 has rhombic mountain portions 23*b* that are long in a width direction, and these mountain portions are fitted together without any gaps in the longitudinal direction and width direction to form a continuous structure. Further, the valley portions 23*a* are formed to connect diagonals of the rhombus.

For the laminated conductive fabric tape 20 including the thermoplastic resin layer 23 having such an uneven structure, when the shielded electric wire 1 (see FIG. 1) is bent to be routed to a vehicle or the like, the unevenness is stretched and becomes flat on the outside of a bend portion. Further, in the laminated conductive fabric tape 20, the unevenness becomes deeper on the inside of the bend portion, and the adjacent mountain portions 23*b* become closer to each other. In this way, since the thermoplastic resin layer 23 has an uneven structure, it is possible to easily follow the bending.

The uneven structure of the thermoplastic resin layer 23 is not limited to those shown in FIGS. 4 to 6. For example, the uneven structure may be one in which the valley portions 23*a* and the mountain portions 23*b* extending simply in a straight line in the width direction are alternately formed, or may be one in which such valley portions 23*a* and mountain portions 23*b* are slightly inclined with respect to the width direction. Further, the valley portions 23*a* and the mountain portions 23*b* may be formed in a checkerboard pattern. That is, the shape of the valley portions 23*a* and the mountain portions 23*b* are not particularly limited as long as they can follow the bending.

Examples and Comparative Examples will be described below. FIGS. 7 to 9 are tables showing examples and comparative examples. The surface roughness Ra was obtained as follows. First, an operator cut out a sample of a conductive fabric to have a width of 50 mm and a length of 100 mm. Next, using a surface roughness meter SJ-201 (manufactured by Mitutoyo), the operator set the evaluation length Ln to 12.5 mm, arranged the sample in the longitudinal direction, performed measurement at room temperature, and read the displayed arithmetic mean roughness. Further, the operator calculated an average value of three arithmetic mean roughness measurements, and set the calculated average value as the final surface roughness Ra.

The Shore A hardness was measured by reading the indicated value after ten seconds using a type A hardness tester (durometer) conforming to JIS K 7215 on a thermoplastic resin sample molded to a thickness of 6 mm using a press molding machine.

Further, the measurement of 100% tensile modulus (referred to as "100% modulus" in Table) was performed as follows. First, a sealing agent that had been applied and dried was rolled into a cylindrical shape to prepare a sample having a thickness of 50 μm, a width of 100 mm, and a length of 100 mm. Thereafter, the sealing agent that had been applied, dried and rolled into a cylindrical shape was molded into a cross-sectional area of 10 $mm^2$ to obtain a molded product. Thereafter, using a tensile tester, the operator set the gripping distance of the chuck to 10 mm and pulled the molded product at a speed of 5 mm/s, and the load at which the molded body was elongated by 10 mm (100%) due to pulling was measured as 100% tensile modulus.

In addition, the following examples and comparative examples were manufactured as follows. First, a T-die film molding machine was used to melt a thermoplastic resin at 200 °C, and the thermoplastic resin was coated onto a conductive fabric to a desired thickness to form a thermoplastic resin layer. Thereafter, when a sealing agent was provided on the surface opposite to the thermoplastic resin layer, the sealing agent was applied to a desired thickness and dried at 120 °C for three minutes to form a sealing agent layer. Next, in a case where the sealing agent layer was provided, an adhesive was applied on the filler layer, or when the sealing agent layer was not provided, on the conductive fabric to a desired thickness, and then dried at 120 °C for five minutes to form an adhesive layer. After the formation, the laminated conductive fabric tape was wound circumferentially.

First, in a laminated conductive fabric tape according to Example 1, a nonwoven fabric plated with copper was used as the conductive fabric. The surface roughness Ra of the conductive fabric was 11.9. The thermoplastic resin layer was formed of PVC having a Shore A hardness of 98 and a thickness of 100 μm. In addition, the laminated conductive fabric tape did not include a sealing agent layer, and the adhesive layer was made of DIC product number W-314 and had a thickness of 40 μm.

A laminated conductive fabric tape according to Example 2 was the same as that of Example 1, except that the surface roughness Ra of the conductive fabric was 23.3, and the thickness of the thermoplastic resin layer was 200 μm.

In a laminated conductive fabric tape according to Example 3, a woven fabric plated with copper was used as the conductive fabric. The surface roughness Ra of the conductive fabric was 20.8. The rest was the same as in Example 2.

A laminated conductive fabric tape according to Example 4 was the same as that of Example 1, except that the thickness of the thermoplastic resin layer was 800 μm.

A laminated conductive fabric tape according to Example 5 was the same as that of Example 1, except that the thickness of the thermoplastic resin layer was 200 μm and the sealing agent layer was provided. The sealing agent layer had a 100% tensile modulus of 0.1 MPa and a thickness of 50 μm.

A laminated conductive fabric tape according to Example 6 was the same as that of Example 5, except that the sealing agent layer had a 100% tensile modulus of 16.4 MPa.

A laminated conductive fabric tape according to Example 7 was the same as that of Example 2, except that the thermoplastic resin layer was made of PP having a Shore A hardness of 95.

A laminated conductive fabric tape according to Example 8 was the same as that of Example 2, except that the thermoplastic resin layer was made of PE having a Shore A hardness of 93.

A laminated conductive fabric tape according to Example 9 was the same as that of Example 5, except that the surface roughness Ra of the conductive fabric was 23.3, and the thickness of the sealing agent layer was 25 μm.

A laminated conductive fabric tape according to Example 10 was the same as that of Example 9, except that the thickness of the adhesive layer was 65 μm.

A laminated conductive fabric tape according to Example 11 was the same as that of Example 10, except that the adhesive layer was Oribain BPW 6570 (manufactured by Toyochem).

A laminated conductive fabric tape according to Comparative Example 1 was the same as that of Example 1, except that the thermoplastic resin layer was not provided.

A laminated conductive fabric tape according to Comparative Example 2 was the same as that of Example 1, except that the thickness of the thermoplastic resin layer was 50 μm.

A laminated conductive fabric tape according to Comparative Example 3 was the same as that of Example 1, except that the thermoplastic resin layer was made of PVC having a Shore A hardness of 25 and a thickness of 100 μm.

A laminated conductive fabric tape according to Comparative Example 4 was the same as that of Comparative Example 3, except that the conductive fabric was a woven fabric having a surface roughness Ra of 8.8.

A laminated conductive fabric tape according to Comparative Example 5 was the same as that of Comparative Example 3, except that the thickness of the thermoplastic resin layer was 850 μm.

A laminated conductive fabric tape according to Comparative Example 6 was the same as that of Example 6, except that the thermoplastic resin layer had a Shore A hardness of 25 and a thickness of 100 μm, and the sealing agent layer had a 100% tensile modulus of 16.5 MPa.

A laminated conductive fabric tape according to Comparative Example 7 was the same as that of Example 1, except that the thermoplastic resin layer had a Shore A hardness of 100.

The Example 1 to Example 11 and Comparative Example 1 to Comparative Example 7 described above were evaluated in three points including adhesiveness, tape edge peeling, and tape abrasion test. The adhesiveness was evaluated by a T-peel test.

In the T-peel test, the operator cut out a sample of the laminated conductive fabric tape to have a width of 19 mm and a length of 250 mm, set the thermoplastic resin layer on one side of the chucks of the tensile tester, and set the conductive fabric on the other side. Thereafter, the operator peeled the sample off at a speed of 300 mm/min, and read the tensile load value at this time. An average value of five tensile load values thus obtained was evaluated, those that were 2 N or more were evaluated as "A", those that were 1 N or more and less than 2 N were evaluated as "B", and those that were less than 1 N were evaluated as "C".

Regarding the tape edge peeling, the laminated conductive fabric tape was wound around a mandrel having a diameter of 10 mm and then left at 80 °C for one week, and evaluated by checking whether peeling occurred at the edge of the tape. Those with a peeling amount of 1.0 mm or less were evaluated as "A", those with a peeling amount of more than 1.0 mm and less than 2.0 mm were evaluated as "B", and those with a peeling amount of 2.0 mm or more were evaluated as "C".

Regarding the tape abrasion test, the laminated conductive fabric tape was cut into a test piece of appropriate length, and the piece was attached to an aluminum pipe having a diameter of 10 mm. The pipe was then set in an abrasion resistance tester specified in JASO D 608, and a load of 4.4 N was applied. Then, the abrasion tape was moved at a speed of 1500 mm/min, and the length of the tape until it came into contact with the aluminum pipe was read. Those with a tape length of 300 mm or more were evaluated as "A", those with a tape length of 100 mm or more and less than 300 mm were evaluated as "B", and those with a tape length of less than 100 mm were evaluated as "C".

As a result of the evaluation, the laminated conductive fabric tapes of the three-layer structure according to Examples 1 to 4, 7, and 8 were rated "B" or "A" in all of the adhesiveness, the tape edge peeling, and the tape abrasion test. Therefore, it was found that a laminated conductive fabric tape having the three-layer structure required the surface roughness Ra of 11.9 or more, and the thermoplastic resin layer required a Shore A hardness of 93 or more and 98 or less and a thickness of 100 μm or more and 800 μm or less.

The adhesive layer remains soft even in the laminated conductive fabric tape in order to exert the adhesiveness, and has almost no effect on the adhesiveness and the tape abrasion test, as well as the tape edge peeling.

On the other hand, since the laminated conductive fabric tape according to Comparative Example 1 did not include the thermoplastic resin layer, it was rated "C" in both the tape edge peeling and the tape abrasion test. In addition, it was found that even when the laminated conductive fabric tape according to Comparative Example 2 was provided with the thermoplastic resin layer of PVC having a Shore A hardness of 98, if the thickness was less than 100 μm, the tape abrasion test resulted in a grade of "C".

Further, it was found that the laminated conductive fabric tape according to Comparative Example 3 had a Shore A hardness of 25 for the thermoplastic resin layer, which was insufficient, and resulted in a grade of "C" in the tape abrasion test. Further, it was found that the laminated conductive fabric tape according to Comparative Example 4 had a surface roughness Ra of less than 11.9, and therefore was rated "C" in terms of adhesiveness. That is, it was found that the thermoplastic resin layer adheres to the adhesive layer when the tape is unwound. Further, it was found that the laminated conductive fabric tape according to Comparative Example 5 had the thickness of the thermoplastic resin layer exceeding 800 μm, which caused the thermoplastic resin layer to become too thick and attempt to return to the original shape, and therefore, the tape edge peeling resulted in a grade of "C". It was found that the laminated conductive fabric tape according to Comparative Example 7 had the Shore A hardness of the thermoplastic resin layer exceeding 98, which caused the thermoplastic resin layer to become too hard and attempt to return to the original shape, and therefore, the tape edge peeling resulted in a grade of "C".

Further, as a result of the evaluation, the laminated conductive fabric tapes of the four-layer structure according to Examples 5, 6, and 9 to 11 were rated "B" or "A" in all of the adhesiveness, the tape edge peeling, and the tape abrasion test. Therefore, it was found that a laminated conductive fabric tape having the four-layer structure required the surface roughness Ra of 11.9 or more, and the thermoplastic resin layer required a Shore A hardness of 98 and a thickness of 200 μm. In addition, it was found that the sealing agent layer required a 100% tensile modulus of 16.4 MPa or less.

In contrast, as shown in Comparative Example 6, when the 100% tensile modulus exceeded 16.4 MPa, the sealing agent layer became too hard and attempted to return to the original shape, and therefore, the tape edge peeling resulted in a grade of "C".

Thus, the laminated conductive fabric tape 20 according to the present embodiment has the three-layer structure including the conductive fabric 21, the adhesive layer 22, and the thermoplastic resin layer 23, and the conductive fabric has a surface roughness Ra of 11.9 or more. Accordingly, a contact area with the thermoplastic resin layer 23 formed on the conductive fabric 21 is ensured, and the conductive fabric 21 and the thermoplastic resin layer 23 are brought into close contact with each other more firmly. As a result, it is possible to reduce the possibility that the thermoplastic resin layer 23 adheres to the adhesive layer 22 when the laminated conductive fabric tape 20 is unwound, causing a decrease in the adhesive strength, thereby preventing the edge peeling. Further, the thermoplastic resin layer 23 has a Shore A hardness of 98 or less and a thickness of 800 μm or less. For this reason, the overall hardness of the thermoplastic resin layer 23 is limited, and it is possible to reduce the possibility that the laminated conductive fabric tape 20 attached to the electric wire 10 attempts to return to the original shape, leading to the edge peeling off. The thermoplastic resin layer 23 has a Shore A hardness of 50 or more and a thickness of 100 μm or more, so that it can exhibit a certain level of abrasion resistance and can also suppress peeling of plating in the usage environment. In particular, it is not necessary to use a release paper in order to suppress the edge peeling and the plating peeling, and there is no need to perform operations such as half-wrapping while peeling off the release paper, which helps to prevent increases in manufacturing costs. Therefore, it is possible to provide the laminated conductive fabric tape 20 capable of suppressing an increase in manufacturing cost, suppressing the edge peeling, and suppressing peeling of plating in a usage environment.

The laminated conductive fabric tape 20 according to the present embodiment has the four-layer structure including the conductive fabric 21, the adhesive layer 22, the thermoplastic resin layer 23, and the sealing agent layer 24. Therefore, the sealing agent layer 24 can reduce the possibility of edge peeling caused by a reduced amount of the adhesive layer 22 that contributes to adhesion due to the adhesive layer 22 penetrating into the conductive fabric 21. Further, the 100% tensile modulus of the sealing agent layer 24 is equal to or less than 16.4 MPa, so that it is possible to reduce the possibility that the laminated conductive fabric tape 20 attached to the electric wire 10 attempts to return to the original shape and leads to the edge peeling due to the sealing agent layer 24 being too hard. As a result, it is possible to provide the laminated conductive fabric tape 20 capable of suppressing an increase in manufacturing cost, suppressing the edge peeling, and suppressing peeling of plating in a usage environment.

The thermoplastic resin layer 23 has an uneven structure in which the valley portions 23*a* recessed toward the one surface side and the mountain portions 23*b* protruding toward the other surface side are continuous with each other. Therefore, when the laminated conductive fabric tape 20 is attached to the electric wire 10 and then routed inside a vehicle and the like, at the time of bending the electric wire, the unevenness is stretched and becomes flat on the outside of a bend portion, while the unevenness becomes deeper and compresses on the inside of the bend portion, making it easier for the electric wire to follow the bend.

Although the present disclosure is described above based on the embodiments, the present disclosure is not limited to the embodiments described above, modifications may be made without departing from the gist of the present disclosure, and known or well-known techniques may be combined.

For example, in the above-described embodiment, the laminated conductive fabric tape 20 is attached to one electric wire 10, but the present disclosure is not limited to being attached to one electric wire 10, and the laminated conductive fabric tape 20 may be attached to a plurality of electric wires 10.

The invention claimed is:

1. A laminated conductive fabric tape having a four-layer structure comprising:

a conductive fabric made of a metal-plated fabric material;

an adhesive layer formed on one surface side of the conductive fabric;

a thermoplastic resin layer formed on another surface side of the conductive fabric; and a sealing agent layer interposed between the conductive fabric and the adhesive layer to prevent the adhesive layer from permeating into the conductive fabric, wherein the conductive fabric has a surface roughness Ra of 11.9 μm or more, wherein the thermoplastic resin layer has a Shore A hardness of 50 or more and 98 or less and a thickness of 100 μm or more and 800 μm or less, and wherein the sealing agent layer has a 100% tensile modulus of 16.4 MPa or less.

2. The laminated conductive fabric tape according to claim 1, wherein the thermoplastic resin layer has an uneven structure in which valley portions recessed toward a conductive fabric side of the thermoplastic resin layer and mountain portions protruding toward an opposite side of the thermoplastic resin layer are continuous.

* * * * *